Jan. 14, 1958 W. T. KEATING 2,820,191

MAGNETIC AMPLIFIER CIRCUIT

Filed March 4, 1955 2 Sheets-Sheet 1

Jan. 14, 1958 W. T. KEATING 2,820,191

MAGNETIC AMPLIFIER CIRCUIT

Filed March 4, 1955 2 Sheets-Sheet 2

INVENTOR.
WILLIAM T. KEATING.
BY Victor D. Borst
ATTORNEY

United States Patent Office 2,820,191

Patented Jan. 14, 1958

2,820,191

MAGNETIC AMPLIFIER CIRCUIT

William T. Keating, St. Albans, N. Y., assignor to Sperry Rand Corporation, a corporation of Delaware Application March 4, 1955, Serial No. 492,107

3 Claims. (Cl. 323—89)

This invention relates to a magnetic amplifier circuit which yields a full wave rectified current to the output being adapted to produce a differential in the load circuit the character of which depends on the type of signal control.

A primary object of the invention is to provide a magnetic amplifier system which pulses the load on both half-cycles of a rectified line current.

The circuit is particularly adapted for operating a split winding motor requiring a differential to be placed on the windings. It could well be employed to produce operating differentials on control coils of a cascaded amplifier system or to control the balance of a conventional bridge network. Another object is therefore to provide a magnetic amplifier system which produces a differential output on each half-cycle of line current.

The circuit employs four reactors with two reactors on each side of the load. Two reactors are disposed in each conducting half of the system and control the impedances in the load circuits for the two halves. The load circuits of each half have a common rectified return lead to the other side of the line. The impedance of the cores is in turn controlled by control windings in the signal circuit. The direction of the turns of the control windings is critical and depends on both the character of the signal and whether a D.-C. or A.-C. differential current in the load circuit is desired. Whether the signal current is alternating or direct, the control windings must be arranged in push-pull relation to the controlled flux in the reactors in the two conducting halves of the system to provide the desired differential in the windings. If an alternating current output is desired in the load circuit, the control windings must be arranged in push-pull relation to the reactors on each side of the load. The actual direction of the turns for producing the push-pull relation will depend on the character of the signal employed.

The invention will be further explained in connection with the embodiment illustrated in the drawings in which.

Figure 1:
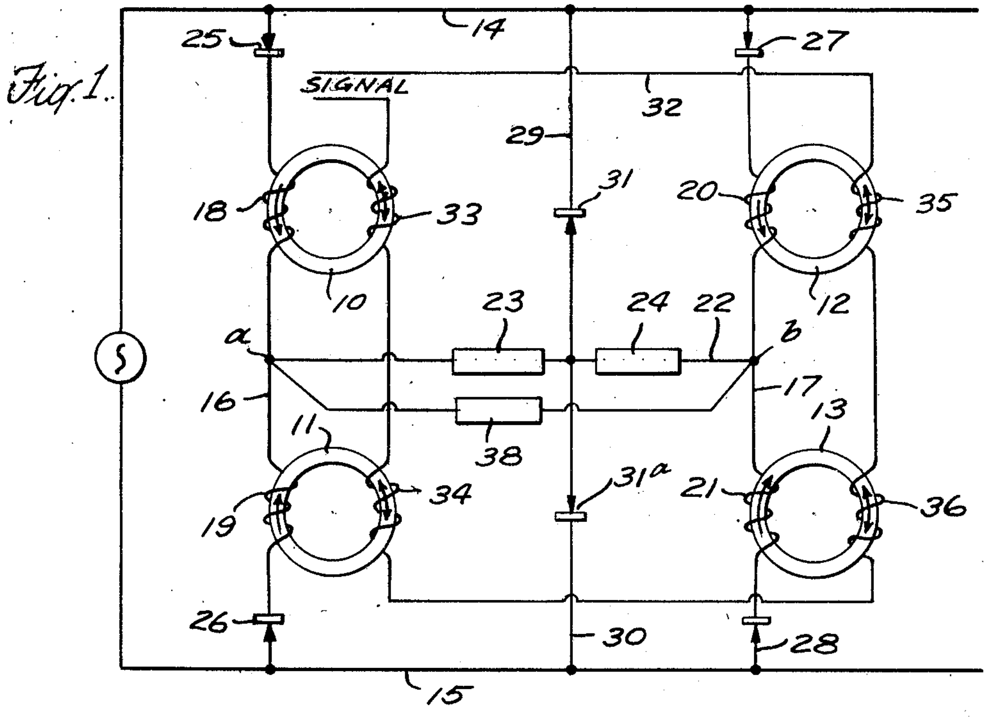
Fig. 1 is a diagram of a magnetic amplifier circuit which produces a full wave rectified load current and a D.-C. differential output for an A.-C. signal or a differential A.-C. output for a D.-C. signal.

Two pairs of reactors 10, 11 and 12 and 13 are connected in parallel across the alternating current lines 14 and 15. The reactors constitute closed magnetic circuits and have windings which are disposed on the cores in the usual manner.

Two branch circuits 16 and 17 are connected in parallel across lines 14 and 15 which are connected to a source of alternating current. Each circuit has a pair of reactor windings 18, 19 and 20 and 21, respectively, which are inductively related to core reactors 10, 11 and 12 and 13, respectively.

An output or load circuit 22 having split load impedances 23 and 24 connects the branch circuits between their reactor windings at points *a* and *b*. Load 38 is connected between the same points. The split load impedances carry the entire current in the branch circuits, the circuits being rectified to permit both half-cycles of line current to flow across the load. To this end half wave rectifiers 25 and 26 are provided in branch circuit 16 on each side of the load circuit connection *a* and are oppositely poled to permit the line current to flow only in the direction of such connection. Similarly half wave rectifiers 27 and 28 are provided in branch circuit 17 on each side of the load circuit connection *b* and are similarly poled for a unidirectional load current.

Leads 29 and 30 connect the load circuit 22 between the split load impedances 23 and 24 to the two sides 14 and 15, respectively, of the line and in combination constitute a lead connection across the line in parallel with the branch circuits. Half wave rectifiers 31 and 31*a* are provided in the leads 29 and 30, respectively, and are poled so as to furnish a return path for the unidirectional load current. The polarity of the rectifiers in the leads 29 and 30 and the branch circuits 16 and 17 makes it apparent that the system is divided into two conducting halves. Lead 30 provides a line return for the current in the reactor windings 18 and 20 and lead 29 provides a return path for the current in reactor windings 19 and 21. The core reactors 10 and 12 are in one conducting half being fluxed by the reactor windings in one half-cycle and reactors 11 and 13 are in the other conducting half-cycle being fluxed on the other half-cycle of line current. Reactors 12 and 13 are on one side of the load and reactors 10 and 11 on the other.

The impedance of the cores is controlled by signal circuit 32 which has control windings 33, 34, 35 and 36 disposed on reactors 10, 11, 12 and 13 respectively. The windings 33 and 35 are arranged in push-pull relation to the flux induced by the reactor windings on cores 10 and 12; similarly the windings 34 and 36 are in push-pull relation to the flux induced by the reactor windings in cores 11 and 13.

The control windings on each side of the load may be arranged in the same relation to the induced flux or in push-pull relation thereto. Where they are in the same relation for either a D.-C. or A.-C. signal, either impedance 23 or 24 will carry more current than the other on both half-cycles. If the control windings are arranged for a D.-C. signal, which pair of reactor windings will carry the higher current will depend on the polarity of the signal. Where the control windings on each side of the load are arranged in push-pull relation with respect to the flux induced by the reactor windings on the respective cores, the load current will in effect be A.-C. with a higher current value in either impedance 23 or 24 every half cycle of line current.

It will be apparent that in Fig. 1 the control windings are wound so that the controlled and controlling flux bear the same directional relation to one another in the reactors on each side of the load for an A.-C. signal, and that they are in push-pull relation for a D.-C. signal. On the other hand in Fig. 2 the control windings are in the same relation to the reactors for a D.-C. signal and are in push-pull relation to the reactors for an A.-C. signal.

A push-pull relation between the reactors on the same side of the load will cause a differential alternating load current with the two impedances 23 and 24 alternately having high and low current values every cycle. If the reactors on each side of the load are brought to the same levels of saturation, one of the impedances will carry the higher current on every half-cycle of line current and the other impedance will carry the lower current. The same results may of course be accomplished by reversing the reactor windings instead of the control windings.

Figure 2:
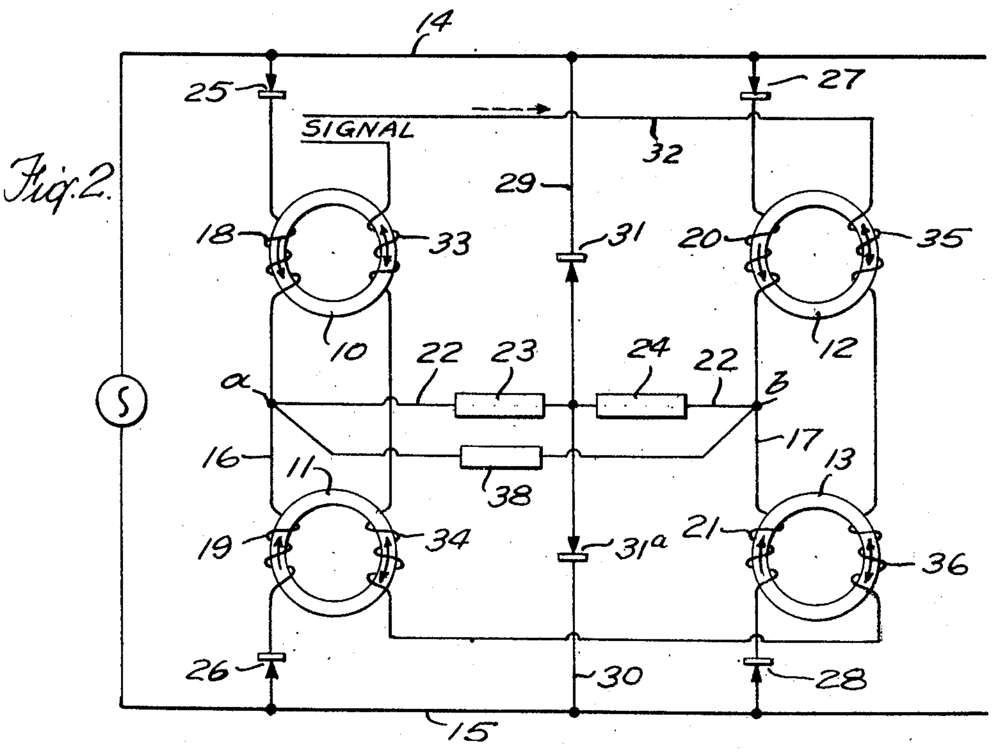
Fig. 2 is a diagram of a magnetic amplifier circuit which produces a full wave rectified load current and an A.-C. differential output for an A.-C. signal or a D.-C. differential output for a D.-C. signal.

If a D.-C. signal is applied to the signal circuit in the direction shown by the dotted arrow in Fig. 2, the control flux opposes the load current-induced flux in reactors 12 and 13 and on the other side of the load the control flux augments the induced flux in reactors 10 and 11. The load current in circuit 17 has therefore a greater impedance than in circuit 16 and impedance 24 will carry a smaller current than impedance 23. The reverse is true if the D.-C. signal is of opposite polarity.

If an A.-C. signal is applied to the signal circuit in Fig. 2 the load current in the output will alternate. The phase of the output will vary with the phase of the signal. Assuming that the line and signal are in phase, it is seen that the reactors 12 and 13 are in push-pull relation as are reactors 10 and 11 on the other side of the load 38. That is, on one half-cycle the controlled and controlling flux are induced in counterclockwise and clockwise directions respectively in reactor 12. Both fluxes are induced in clockwise directions on the other half-cycle in reactor 13. Hence, on the first half-cycle the current in impedance 24 is small and is high on the other half-cycle. The same is true on the other side of the load for impedance 23 except that the high and low currents occur on the opposite half-cycles which accounts for the alternating current effect across load 38.

The direction of turns of the control windings for reactors 11 and 13 in Fig. 1 are the reverse of the same windings in Fig. 2. The results obtained in the load are the opposite of those in Fig. 2 for A.-C. and D.-C. signals. That is, the control flux is in push-pull relation to the controlled flux in cores 12 and 13 as well as in the cores on the other side of the load for a D.-C. signal with the phase of the alternating current in the load depending on the polarity of the signal. If the signal is A.-C. the saturation of the cores is affected in the same sense on each side of the load and the current is higher on one side than the other on both half-cycles of line current. Whether impedance 23 or 24 carries the higher current depends on the relative polarity of the reactor and control windings on each core. Specifically reversing all four control windings as shown in Fig. 1 will reverse polarity of the load.

Figure 3:
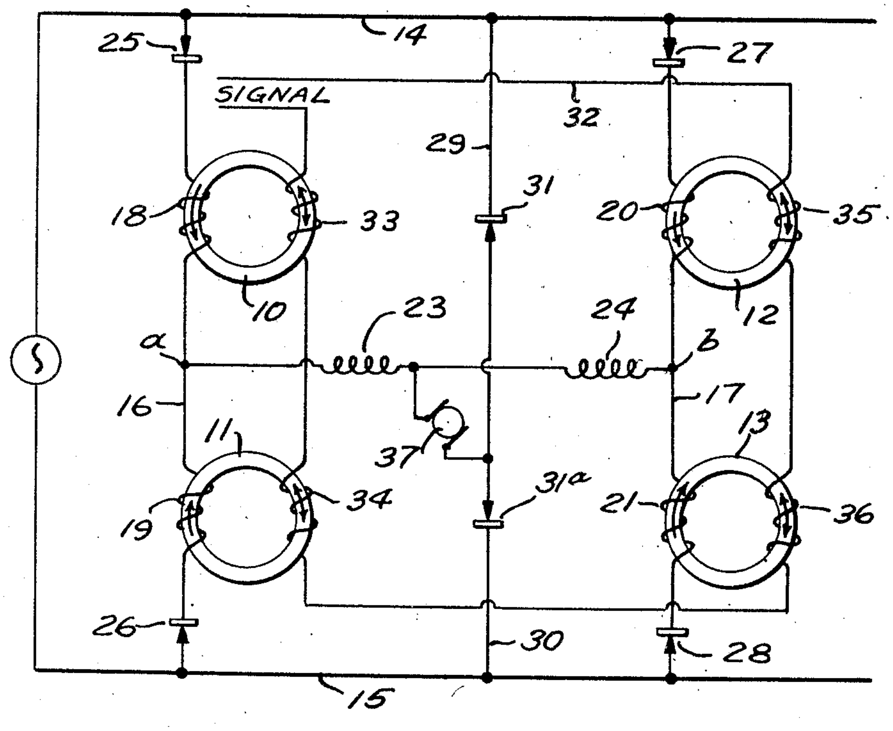
Fig. 3 is a diagram of a magnetic amplifier circuit having a D.-C., split winding motor for a load.

It is understood that the control windings in the two conducting halves of the system are wound in push-pull relation with respect to the core reactors on which they are wound. It is contemplated that the impedances require a current differential through them as would be the case were they solenoids or the control coils of a cascaded magnetic amplifier circuit, or the impedances of a split field winding motor with the armature 37 disposed, for example, as in Fig. 3.

Other modifications in the circuit will readily occur to those skilled in the art within the principle of the invention as defined in the following claims:

What is claimed is:

1. A magnetic amplifier comprising two pairs of closed magnetic circuits, a reactor winding disposed on each magnetic circuit, an alternating current line, two branch circuits connected in parallel across the line, each branch circuit including in series two of said reactor windings, a load circuit connecting the two branch circuits at points intermediate the magnetic circuits in each branch, a pair of half wave rectifiers in the branch circuits, one rectifier being disposed on each side of the load circuit connections and poled in the direction of said connections, a signal circuit having a control winding disposed on each magnetic circuit, the said control windings in each conducting half of the system being arranged in push-pull relation to the magnetic circuits on which they are disposed, a lead parallel to the branch circuits and connecting said load circuit to both sides of the line and half wave rectifiers in said lead disposed on each side of the load circuit connection and poled in the direction of the line.

2. A magnetic amplifier as claimed in claim 1 wherein the control windings on each side of the load are arranged in the same relation with respect to the flux induced by the load current in the reactor windings on the conducting half-cycles for an A.-C. current, being wound in push-pull relation to the said induced flux for a D.-C. signal.

3. A magnetic amplifier as claimed in claim 1 wherein the control windings on each side of the load are arranged in push-pull relation with respect to the flux induced by the load current in the reactor windings on the conducting half-cycles for an A.-C. signal, being wound in the same relation with respect to said induced flux for a D.-C. signal.

No references cited.